(12) United States Patent
Tanaka

(10) Patent No.: US 11,345,344 B2
(45) Date of Patent: May 31, 2022

(54) VEHICLE TRAVEL CONTROL APPARATUS

(71) Applicant: TOYOTA JIDOSHA KABUSHIKI KAISHA, Toyota (JP)

(72) Inventor: Kazuma Tanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 107 days.

(21) Appl. No.: 16/809,077

(22) Filed: Mar. 4, 2020

(65) Prior Publication Data

US 2020/0298851 A1  Sep. 24, 2020

(30) Foreign Application Priority Data

Mar. 20, 2019 (JP) .............................. JP2019-052684

(51) Int. Cl.
*B60W 30/14* (2006.01)
*B60K 31/04* (2006.01)
*B60W 50/10* (2012.01)

(52) U.S. Cl.
CPC ......... *B60W 30/143* (2013.01); *B60K 31/047* (2013.01); *B60W 50/10* (2013.01)

(58) Field of Classification Search
CPC .... B60W 30/143; B60W 50/10; B60K 31/047
See application file for complete search history.

(56) References Cited

U.S. PATENT DOCUMENTS

| | | | |
|---|---|---|---|
| 2006/0025918 A1 | 2/2006 | Saeki | |
| 2009/0240398 A1* | 9/2009 | Nanami | B60W 40/04 701/41 |
| 2012/0268665 A1* | 10/2012 | Yetukuri | B60K 35/00 348/837 |
| 2017/0043778 A1* | 2/2017 | Kelly | B60W 30/18027 |
| 2018/0079411 A1* | 3/2018 | Inoguchi | B60W 30/146 |
| 2018/0118208 A1 | 5/2018 | Inoguchi et al. | |
| 2020/0062276 A1* | 2/2020 | Yuan | B60W 30/14 |

FOREIGN PATENT DOCUMENTS

| | | |
|---|---|---|
| JP | 2005-47304 A | 2/2005 |
| JP | 2006-315491 A | 11/2006 |
| JP | 4172434 B2 | 10/2008 |
| JP | 4929777 B2 | 5/2012 |
| JP | 2014-148293 A | 8/2014 |
| JP | 2018-47795 A | 3/2018 |
| JP | 2018-70040 A | 5/2018 |

* cited by examiner

*Primary Examiner* — Nicholas Kiswanto
*Assistant Examiner* — Jamal A Shah
(74) *Attorney, Agent, or Firm* — Sughrue Mion, PLLC

(57) ABSTRACT

Provided is a vehicle travel control apparatus including: a vehicle controller configured to execute constant speed travel control for causing a vehicle to travel at a target speed, and configured to execute a target speed increasing process of increasing the target speed by a predetermined speed increase amount; a display device configured to display a setting screen which allows a driver to change at least the speed increase amount; and a memory configured to store the speed increase amount changed on the setting screen, the vehicle controller being further configured to execute the target speed increasing process in accordance with the speed increase amount which has been stored in the memory.

2 Claims, 7 Drawing Sheets

VEHICLE TRAVEL CONTROL APPARATUS

CROSS-REFERENCES TO RELATED APPLICATION

The present application claims priority to Japanese patent application No. JP 2019-052684 filed on Mar. 20, 2019, the content of which is hereby incorporated by reference in its entirety.

BACKGROUND

Technical Field

The present disclosure relates to a vehicle travel control apparatus configured to execute constant speed travel control for causing a vehicle to travel such that the speed of the vehicle matches (becomes equal to) a target speed.

Description of the Related Art

Hitherto, there has been proposed a vehicle travel control apparatus which allows a driver of a vehicle to increase and decrease a target speed (set speed) for constant speed travel by operating a speed increasing switch and a speed decreasing switch provided in the vehicle (see, for example, Japanese Patent Application Laid-Open (kokai) No. 2005-047304).

Conventionally, the target speed is changed by a fixed amount with each operation of the speed increasing switch or the speed decreasing switch. Accordingly, the following problem may arise. For example, in the case where the driver wants to increase the target speed greatly, if the change amount per operation of the speed increasing switch is small, the driver needs a long time to increase the target speed to a desired speed.

In this case, the driver may feel the operation to be troublesome. Meanwhile, the driver may prefer to finely adjust the target speed. In such a case, if the change amount per operation of the speed increasing switch is large, the driver may feel dissatisfaction.

SUMMARY

The present disclosure provides a vehicle travel control apparatus capable of changing, according to a driver's preference, an amount by which a target speed is changed in response to operation of either of a speed increasing switch and a speed decreasing switch.

According to one or more embodiments, there is provided a vehicle travel control apparatus including: an operation device provided in a vehicle and configured to be operated by a driver, the operation device including a speed increasing switch configured to become an on state when a pressing operation is performed on the speed increasing switch, and configured to become an off state when the pressing operation is not performed on the speed increasing switch; a vehicle controller configured to execute constant speed travel control for causing the vehicle to travel such that a travel speed of the vehicle matches a target speed, the vehicle controller being further configured to execute a target speed increasing process of increasing the target speed by a predetermined speed increase amount at a predetermined timing within a time period between a first turned-on time point at which the speed increasing switch is switched from the off state to the on state and a first turned-off time point at which the speed increasing switch is switched from the on state to the off state; a display device configured to display a setting screen which allows the driver to change at least the speed increase amount; and a memory configured to store at least the speed increase amount which has been changed on the setting screen. The vehicle controller is configured to execute the target speed increasing process in accordance with the speed increase amount which has been stored in the memory.

According to the vehicle travel control apparatus, the driver can change the speed increase amount used in the target speed increasing process, on the setting screen displayed on the display device. The speed increase amount changed on the setting screen is stored in the memory. The vehicle controller executes the target speed increasing process in accordance with the speed increase amount stored in the memory. This configuration allows the driver to change, in accordance with his/her preference, the speed increase amount by which the target speed is increased when the driver operates the speed increasing switch.

In one or more embodiments, the vehicle controller is configured to increase the target speed by using a first increase amount and a second increase amount as the speed increase amount in the target speed increasing process. The vehicle controller is configured to execute a first increasing process and a second increasing process as the target speed increasing process. The first increasing process is a process of increasing the target speed by the first increase amount at the first turned-on time point or a process of increasing the target speed by the first increase amount at the first turned-off time point in a case where the first turned-off time point is a point in time before a predetermined first long press time elapses from the first turned-on time point. The second increasing process is a process performed in a case where the on state of the speed increasing switch continues from the first turned-on time point for the first long press time or longer, and performed such that, after elapse of the first long press time from the first turned-on time point, the process increases the target speed stepwise, until the first turned-off time point, by the second increase amount every time a first interval time elapses. The display device is configured to display, as the setting screen, a screen which allows the driver to change the first increase amount, the second increase amount, and the first interval time. The memory is configured to store the first increase amount, the second increase amount, and the first interval time which have been changed on the setting screen. The vehicle controller is configured to execute the target speed increasing process in accordance with the first increase amount, the second increase amount, and the first interval time which have been stored in the memory.

According to this configuration, the driver can change, in accordance with his/her preference, the first increase amount used when the first increasing process is executed, and the second increase amount and the first interval time used when the second increasing process is executed.

In one or more embodiments, the operation device further includes a speed decreasing switch configured to become an on state when a pressing operation is performed on the speed decreasing switch, and configured to become an off state when the pressing operation is not performed on the speed decreasing switch. The vehicle controller is configured to execute a target speed decreasing process of decreasing the target speed by a predetermined speed decrease amount at a predetermined timing within a time period between a second turned-on time point at which the speed decreasing switch is switched from the off state to the on state and a second turned-off time point at which the speed decreasing switch is switched from the on state to the off state. The display device is configured to display, as the setting screen, a screen which allows the driver to change the speed decrease amount. The memory is configured to further store the speed decrease amount which has been changed on the setting screen. The vehicle controller is configured to execute the target speed decreasing process in accordance with the speed decrease amount which has been stored in the memory.

According to this configuration, the driver can change the speed decrease amount used in the target speed decreasing process, on the setting screen displayed on the display device. The speed decrease amount changed on the setting screen is stored in the memory. The vehicle controller executes the target speed decreasing process in accordance with the speed decrease amount stored in the memory. This configuration allows the driver to change, in accordance with his/her preference, the speed decrease amount by which the target speed is decreased when the driver operates the speed decreasing switch.

In one or more embodiments, the vehicle controller is configured to decrease the target speed by using a first decrease amount and a second decrease amount as the speed decrease amount in the target speed decreasing process. The vehicle controller is configured to execute a first decreasing process and a second decreasing process as the target speed decreasing process. The first decreasing process is a process of decreasing the target speed by the first decrease amount at the second turned-on time point or a process of decreasing the target speed by the first decrease amount at the second turned-off time point in a case where the second turned-off time point is a point in time before a predetermined second long press time elapses from the second turned-on time point. The second decreasing process is a process performed in a case where the on state of the speed decreasing switch continues from the second turned-on time point for the second long press time or longer, and performed such that, after elapse of the second long press time from the second turned-on time point, the process decreases the target speed stepwise, until the second turned-off time point, by the second decrease amount every time a second interval time elapses. The display device is configured to display, as the setting screen, a screen which allows the driver to change the first decrease amount, the second decrease amount, and the second interval time. The memory is configured to store the first decrease amount, the second decrease amount, and the second interval time which have been changed on the setting screen. The vehicle controller is configured to execute the target speed decreasing process in accordance with the first decrease amount, the second decrease amount, and the second interval time which have been stored in the memory.

According to this configuration, the driver can change, in accordance with his/her preference, the first decrease amount used when the first decreasing process is executed, and the second decrease amount and the second interval time used when the second decreasing process is executed.

According to one or more embodiments, the above-mentioned vehicle controller is implemented by a microprocessor programmed for performing one or more operations and/or functionality described herein. In addition, the vehicle controller may be implemented, in whole or in part, by specifically configured to hardware (e.g., by one or more application specific integrated circuits or ASIC(s)). According to one or more embodiments, the above-mentioned memory includes a readable and writable recording/storage medium such as a random access memory (RAM), a flash memory, and the like.

In the above description, in order to facilitate understanding of the present disclosure, names and/or reference symbols used in at least one embodiment described later are enclosed in parentheses and are assigned to each of the constituent features corresponding to the at least one embodiment. However, each of the constituent features is not limited to the at least one embodiment defined by the reference symbols.

DESCRIPTION OF THE EMBODIMENTS

Figure 1:
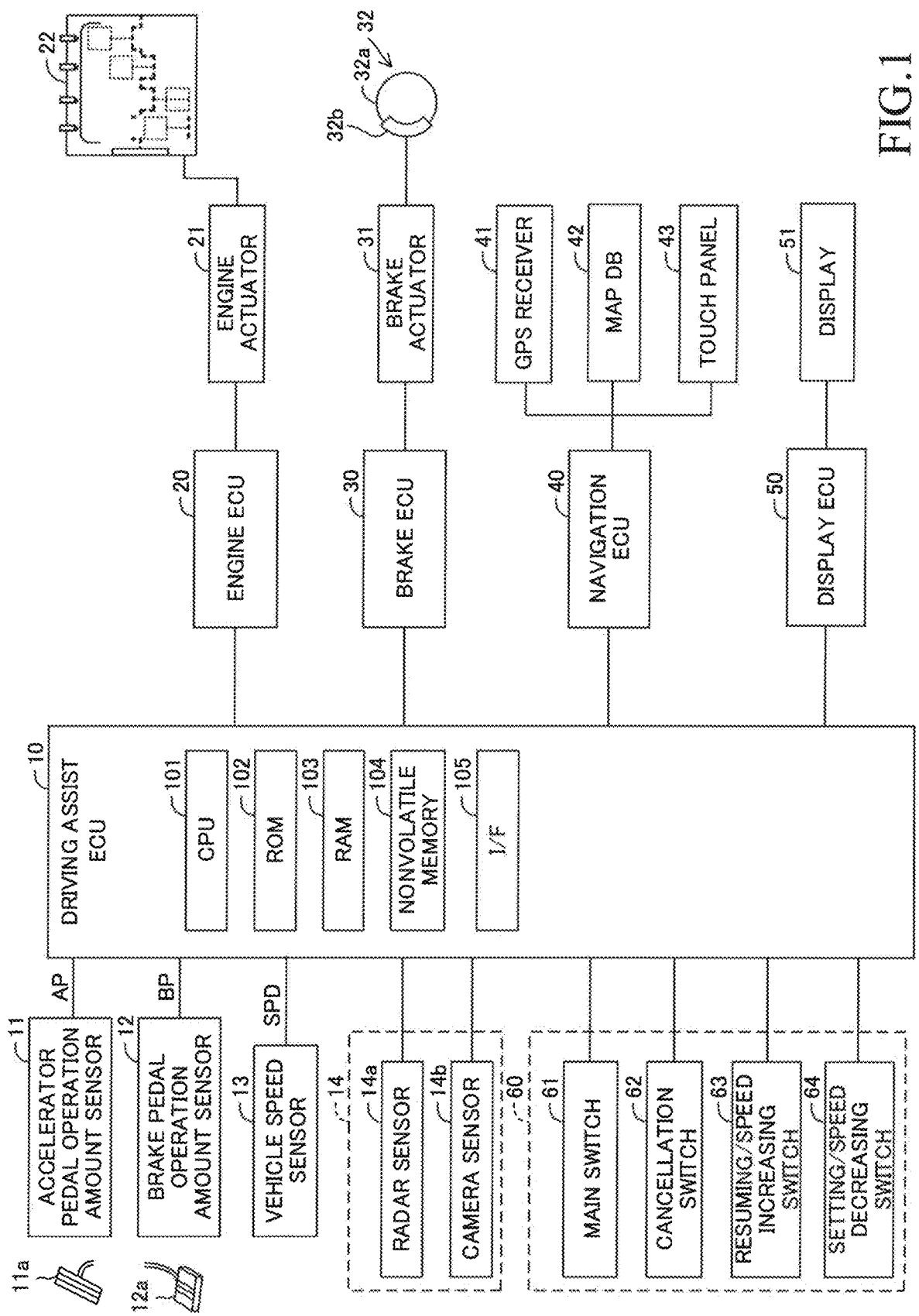
FIG. 1 is a schematic configuration diagram of a vehicle travel control apparatus according to at least one embodiment of the present disclosure.

As illustrated in FIG. 1, a vehicle travel control apparatus according to at least one embodiment (hereinafter simply referred to as a "control apparatus" in some cases) is applied to a vehicle. The vehicle to which the control apparatus is applied may be referred to as an "own vehicle" for distinction from other vehicles.

The control apparatus includes a driving assist ECU 10, an engine ECU 20, a brake ECU 30, a navigation ECU 40, and a display ECU 50. Those ECUs are electric control units each including a microcomputer as a main component, and are connected together through an unillustrated CAN (controller area network) such that the ECUs can send and receive pieces of information to and from one another.

The microcomputer herein includes a CPU, a ROM, a RAM, a nonvolatile memory, an interface (I/F), etc. For example, the driving assist ECU 10 includes a CPU 101, a ROM 102, a RAM 103, a nonvolatile memory 104, an interface 105, etc. The CPU realizes various functions by executing instructions (programs, routines) stored in the ROM.

The driving assist ECU 10 is connected to sensors (including switches) listed below and receives detection signals or output signals from these sensors. Alternatively, each sensor may be connected to an ECU other than the driving assist ECU 10. In such a case, the driving assist ECU 10 receives, through the CAN, the detection signal or output signal of that sensor from the ECU to which that sensor is connected.

An accelerator pedal operation amount sensor 11 is configured to detect an operation amount of an accelerator pedal 11*a* (accelerator opening) and output a signal representing the accelerator pedal operation amount AP.

A brake pedal operation amount sensor 12 is configured to detect an operation amount of a brake pedal 12*a* and output a signal representing the brake pedal operation amount BP.

A vehicle speed sensor 13 is configured to detect a travel speed of the vehicle (vehicle speed) and output a signal representing the vehicle speed SPD.

A surrounding sensor 14 is configured to obtain information on a road around the vehicle (the own vehicle) (e.g., a traveling lane in which the own vehicle travels) and information on three-dimensional objects present on the road. Examples of the three-dimensional objects include moving objects such as automobiles (other vehicles), pedestrians, and bicycles, as well as stationary objects such as and guard rails and fences. In the following description, these three-dimensional objects may be referred to as "objects". The surrounding sensor 14 includes a radar sensor 14*a* and a camera sensor 14*b*.

The radar sensor 14*a* radiates, for example, a radio wave in the millimeter wave band (hereinafter referred to as a "millimeter wave") to a peripheral region of the own vehicle, and receives a millimeter wave reflected by an object present in the radiation range (i.e., reflection wave). The peripheral region includes at least a region in front of the own vehicle. Further, by using a relationship between the transmitted millimeter wave and the received reflection wave, the radar sensor 14*a* determines whether or not an object is present, computes a piece of information representing the relative relationship between the own vehicle and the object, and outputs the result of the determination and the result of the computation. Examples of the information representing the relative relationship between the own vehicle and the object include a distance between the own vehicle and the object, an orientation (or position) of the object with respect to the own vehicle, a relative speed of the object with respect to the own vehicle, and other such information.

More specifically, the radar sensor 14*a* includes a millimeter wave transceiver (transmission/reception part) and a signal processor. Every time a predetermined time elapses, the signal processor obtains a piece of information representing the relative relationship between the own vehicle and the object on the basis of a phase difference between the millimeter wave transmitted from the millimeter wave transceiver and the reflection wave received by the millimeter wave transceiver, an attenuation level of the reflection wave, a period of time between transmission of the millimeter wave and reception of the reflection wave, etc. This information includes "longitudinal distance Dfx(n), relative speed Vfx(n), lateral distance Dfy(n), relative lateral speed Vfy(n), and other such information" regarding each detected object (n) as shown below.

The longitudinal distance Dfx(n) is the distance between the own vehicle and the object (n) (for example, a preceding vehicle) measured along a center axis of the own vehicle (center axis extending in the longitudinal direction thereof). In the case where the object (n) is a preceding vehicle, the longitudinal distance Dfx(n) is the intervehicle distance between the own vehicle and the preceding vehicle.

The relative speed Vfx(n) is a difference between the speed Vs of the object (n) (for example, the preceding vehicle) and the vehicle speed SPD of the own vehicle (Vfx(n)=Vs−SPD). The speed Vs of the object (n) is a speed of the object (n) in a travel direction of the own vehicle.

The lateral distance Dfy(n) is a distance of a "center position of the object (n) (for example, a center position of the preceding vehicle in a vehicle width direction)" from the center axis of the own vehicle, the distance being measured in the direction orthogonal to the center axis of the own vehicle.

The relative lateral speed Vfy(n) is a speed of the center position of the object(n) (e.g., the center position of the preceding vehicle in the vehicle width direction) in the direction orthogonal to the center axis of the own vehicle.

The camera sensor 14*b* includes a camera and an image processor. The camera sensor 14*b* captures images of a scene in front of the own vehicle to obtain image data. The camera is a monocular camera or a stereo camera. The camera sensor 14*b* determines whether or not an object is present on the basis of the image data, computes a piece of information representing the relative relationship between the own vehicle and the object, and outputs the result of the determination and the result of the computation. The driving assist ECU 10 determines the information representing the relative relationship between the own vehicle and the object by combining the "information representing the relative relationship between the own vehicle and the object" obtained by the radar sensor 14*a* and the "information representing the relative relationship between the own vehicle and the object" obtained by the camera sensor 14*b*.

The information on the object obtained by the surrounding sensor 14 (including the information representing the relative relationship between the own vehicle and the object) will be referred to as "object information." The surrounding sensor 14 repeatedly transmits the object information to the driving assist ECU 10 every time a predetermined sampling time elapses.

The surrounding sensor 14 is not necessarily required to include both the radar sensor and the camera sensor. For example, the surrounding sensor 14 may include the radar sensor only or the camera sensor only.

The engine ECU 20 is connected to an engine actuator 21. The engine actuator 21 includes a throttle valve actuator for changing an opening degree of a throttle valve of an internal combustion engine 22. The engine ECU 20 can change the torque generated by the internal combustion engine 22 by driving the engine actuator 21. The torque generated by the internal combustion engine 22 is transmitted to drive wheels (not shown) through a transmission (not shown). Accordingly, the engine ECU 20 can control a driving force of the vehicle by controlling the engine actuator 21, to thereby change an acceleration state (acceleration) of the vehicle.

In the case where the vehicle is a hybrid vehicle, the engine ECU 20 can control a driving force generated by one or both of "an internal combustion engine and a motor" serving as vehicle driving sources. In the case where the vehicle is an electric car, the engine ECU 20 can control a driving force generated by a motor serving as a vehicle driving source.

The brake ECU 30 is connected to a brake actuator 31. The brake actuator 31 is provided in a hydraulic circuit (not shown) extending between a master cylinder configured to pressurize hydraulic oil with a stepping force applied to the brake pedal 12*a* and friction brake mechanisms 32 provided in front left, front right, rear left, and rear right wheels. The brake actuator 31 adjusts the pressure of oil supplied to a wheel cylinder incorporated into a brake caliper 32b of each friction brake mechanisms 32 in accordance with an instruction from the brake ECU 30. When the wheel cylinder is operated by the oil pressure, a brake pad is pressed against a brake disc 32a, whereby a frictional braking force is generated. Accordingly, the brake ECU 30 can control the braking force of the vehicle by controlling the brake actuator 31, to thereby change an acceleration state (deceleration; i.e., negative acceleration) of the vehicle.

The navigation ECU 40 includes a GPS receiver 41 configured to receive GPS signals for detecting the "latitude and longitude" of the place where the own vehicle is present, a map database 42 configured to store map information, and a touch panel 43. The touch panel 43, which is a well known a touch-panel-type display, displays a map, images, etc., and allows input operation using a finger. For convenience, the touch panel 43 will be referred to also as a "display device". The navigation ECU 40 performs various types of computation processes on the basis of, for example, the map information and the latitude and longitude of the place where the own vehicle is located, and displays, on the touch panel 43, the position of the own vehicle on the map. In the following description, a display mode used when "a map and the position of the own vehicle on the map" are displayed on the touch panel 43 will be referred to as a "navigation mode."

The display modes of the touch panel 43 include an ACC setting mode in addition to the navigation mode. The ACC setting mode is a display mode used for performing various types of settings regarding follow-up intervehicle distance control which will be described later. In the following description, the follow-up intervehicle distance control will be referred to as "ACC: Adaptive Cruise Control". The ACC includes two types of controls; i.e., control for a constant speed travel mode and control for follow-up travel mode. When the vehicle is in a stopped state and a specific button (mode switching button) of a screen displayed on the touch panel 43 is depressed (touched with a finger), the display mode is switched to the ACC setting mode.

The display ECU 50 is connected to a display 51. The display 51 is a multi-information display disposed in front of the driver's seat. The display 51 displays various pieces of information, including the measured values of the vehicle speed SPD, engine rotational speed, etc., on the basis of an instruction signal from the display ECU 50. A head-up display may be employed as the display 51.

A steering wheel (not shown) of the vehicle has an operation device 60 for the ACC at a position which is located on the side facing toward the driver and at which the operation device 60 can be operated by the driver. The operation device 60 includes a main switch 61, a cancellation switch 62, a resuming/speed increasing switch 63, and a setting/speed decreasing switch 64. Specific methods for operating these switches 61 to 64 will be described later.

(Outline of ACC)

The driving assist ECU 10 is configured to perform the ACC. The ACC itself is well known (see, for example, Japanese Patent Application Laid-Open (kokai) No. 2014-148293, Japanese Patent Application Laid-Open (kokai) No. 2006-315491, Japanese Patent No. 4172434, and Japanese Patent No. 4929777).

As described above, the ACC includes two types of controls; i.e., control for a constant speed travel mode and control for follow-up travel mode. The control for the constant speed travel mode is a control for causing the vehicle to travel such that the travel speed of the vehicle matches (becomes equal to) a target speed (set speed) Vset, without requiring operations of the accelerator pedal 11a and the brake pedal 12a. The control for the follow-up travel mode is a control for causing the own vehicle to follow a preceding vehicle travelling immediately ahead of the own vehicle, while maintaining an intervehicle distance between the preceding vehicle and the own vehicle at a predetermined distance.

When the ACC is started (when the main switch 61 is brought into an on state as will be described later), the driving assist ECU 10 determines, on the basis of the object information obtained by the surrounding sensor 14, whether or not there is a following target vehicle. The following target vehicle is a vehicle which is traveling ahead of (immediately ahead of) the own vehicle and which is to be followed by the own vehicle. For example, the driving assist ECU 10 determines whether or not the relative position of the object (n) determined from the lateral distance Dfy(n) and longitudinal distance Dfx(n) of the detected object (n) is present within a predetermined followed-up vehicle area.

In the case where the object (n) is not present in the followed-up vehicle area, the driving assist ECU 10 determines that there is no following target vehicle. In this case, the driving assist ECU 10 executes the control for the constant speed travel mode. Namely, the driving assist ECU 10 determines a target acceleration Gtgt on the basis of the target speed Vset and the vehicle speed SPD such that the vehicle speed SPD of the vehicle matches the target speed Vset. When the target speed Vset matches the vehicle speed SPD, the driving assist ECU 10 sets the target acceleration Gtgt to "0." When the target speed Vset is higher than the vehicle speed SPD, the driving assist ECU 10 increases the target acceleration Gtgt. When the target speed Vset is lower than the vehicle speed SPD, the driving assist ECU 10 decreases the target acceleration Gtgt.

In order that the acceleration of the vehicle matches the target acceleration Gtgt, the driving assist ECU 10 controls the drive force by controlling the engine actuator 21 by using the engine ECU 20 and, when necessary, controls the braking force by controlling the brake actuator 31 by using the brake ECU 30.

In contrast, in the case where the object (n) is present in the followed-up vehicle area for a predetermined period of time or longer, the driving assist ECU 10 chooses that object (n) as the following target vehicle (a). The driving assist ECU 10 then executes the control for the follow-up travel mode. Specifically, the driving assist ECU 10 determines the target acceleration Gtgt on the basis of a deviation between the "intervehicle distance to the following target vehicle (a) (i.e., Dfx(a)) and a target intervehicle distance Dset" and the "relative speed (Vfx(a)) of the following target vehicle (a)," etc. The driver sets or changes the target intervehicle distance Dset by operating an intervehicle distance setting switch (not shown). In order to render the acceleration of the vehicle coincident with the target acceleration Gtgt, as described above, the driving assist ECU 10 controls the drive force by controlling the engine actuator 21 and, when necessary, controls the braking force by controlling the brake actuator 31.

(Method of Operating Operation Device)

Next, a method of operating the switches 61 to 64 of the operation device 60 will be described.

The main switch 61 is a switch to be operated by the driver when the ACC is started or terminated. Every time the main switch 61 is depressed, the state of the main switch 61 changes between on and off states. When the main switch 61 is switched from the off state to the on state, the driving assist ECU 10 starts the ACC. Meanwhile, when the main switch 61 is switched from the on state to the off state, the driving assist ECU 10 terminates the ACC.

The cancellation switch 62 is a switch to be operated by the driver when the ACC is temporarily stopped (temporarily cancelled). Every time the cancellation switch 62 is depressed, the state of the cancellation switch 62 changes between on and off states. When the cancellation switch 62 becomes the on state in a period during which the main switch 61 is in the on state (the ACC is being executed), the driving assist ECU 10 temporarily stops the ACC.

The resuming/speed increasing switch 63 is a switch to be operated by the driver when the ACC is resumed after the ACC is temporarily stopped. In the following description, the resuming/speed increasing switch 63 will be simply referred to as the "speed increasing switch 63." The speed increasing switch 63 is configured to become an on state when pressed by the driver, and become an off state when not pressed by the driver.

When the state of the speed increasing switch 63 is changed from the off state to the on state in a period during which the main switch 61 is in the on state and the cancellation switch 62 is in the on state (namely, in a state in which the ACC has been temporarily stopped), the driving assist ECU 10 resumes the ACC. When the ACC is resumed, the driving assist ECU 10 changes the state of the cancellation switch 62 to the off state. In the case where there is no following target when the ACC is resumed, the driving assist ECU 10 resumes the control for the constant speed travel mode by using the target speed Vset used at the time when the ACC was temporarily stopped.

In the case where the driving assist ECU 10 is executing the control for the follow-up travel mode, when the following target vehicle (a) stops, the own vehicle also stops. When the following target vehicle (a) starts the traveling after that, the driving assist ECU 10 maintains the own vehicle in the stopped state. When the state of the speed increasing switch 63 is changed from the off state to the on state in such a state, the driving assist ECU 10 resumes the control for the follow-up travel mode.

The speed increasing switch 63 is also a switch to be operated by the driver when the target speed Vset is increased. The method of operating the speed increasing switch 63 so as to increase the target speed Vset will be described later.

The setting/speed decreasing switch 64 is a switch to be operated by the driver when the target speed Vset is set. In the following description, the setting/speed decreasing switch 64 will be simply referred to as the "speed decreasing switch 64." The speed decreasing switch 64 is configured to become an on state when pressed by the driver, and become an off state when not pressed by the driver.

When the state of the speed decreasing switch 64 is changed from the off state to the on state after the ACC is started, the driving assist ECU 10 sets the target speed Vset to the "vehicle speed SPD at the point in time when the speed decreasing switch 64 entered the on state (namely, the point in time when the driver pressed the speed decreasing switch 64)."

The speed decreasing switch 64 is also a switch to be operated by the driver when the target speed Vset is decreased. The method of operating the speed decreasing switch 64 so as to decrease the target speed Vset will be described later.

(Target Speed Increasing Process and Target Speed Decreasing Process)

In a period during which the control for the constant speed travel mode is being executed, the driving assist ECU 10 executes a target speed increasing process of increasing the target speed Vset in response to an operation on the speed increasing switch 63. Specifically, the driving assist ECU 10 increases the target speed Vset at a predetermined timing within a time period between a point in time at which the speed increasing switch 63 is switched from the off state to the on state and a point in time at which the speed increasing switch 63 is switched from the on state to the off state (hereinafter referred to as a "speed increasing switch operation period"). The speed increasing switch operation period includes the point in time at which the speed increasing switch 63 is switched from the off state to the on state and the point in time at which the speed increasing switch 63 is switched from the on state to the off state.

Further, in the period during which the control for the constant speed travel mode is being executed, the driving assist ECU 10 executes a target speed decreasing process of decreasing the target speed Vset in response to an operation on the speed decreasing switch 64. Specifically, the driving assist ECU 10 decreases the target speed Vset at a predetermined timing within a time period between a point in time at which the speed decreasing switch 64 is switched from the off state to the on state and a point in time at which the speed decreasing switch 64 is switched from the on state to the off state (hereinafter referred to as a "speed decreasing switch operation period"). The speed decreasing switch operation period includes the point in time at which the speed decreasing switch 64 is switched from the off state to the on state and the point in time at which the speed decreasing switch 64 is switched from the on state to the off state.

An operation performed on the speed increasing switch 63 in such a manner that the on state of the speed increasing switch 63 is continued (maintained) for a predetermined first long press time Tlp1 or longer will be referred to as a "long press operation of the speed increasing switch 63." Further, an operation performed on the speed decreasing switch 64 in such a manner that the on state of the speed decreasing switch 64 is continued (maintained) for a predetermined second long press time Tlp2 or longer will be referred to as a "long press operation of the speed decreasing switch 64." In the present embodiment, the first long press time Tlp1 and the second long press time Tlp2 are set to the same value. The first long press time Tlp1 and the second long press time Tlp2 may be set to respective values different from each other.

Meanwhile, an "operation performed on the speed increasing switch 63 in such a manner that, after the speed increasing switch 63 has been switched from the off state to the on state, the state of the speed increasing switch 63 is returned from the on state to the off state before elapse of the first long press time Tlp2" will be referred to as a "short press operation of the speed increasing switch 63." Further, an "operation performed on the speed decreasing switch 64 such that, after the speed decreasing switch 64 has been switched from the off state to the on state, the state of the speed decreasing switch 64 is returned from the on state to the off state before elapse of the second long press time Tlp2" will be referred to as a "short press operation of the speed decreasing switch 64."

A1: Change of Target Speed Vset by Short Press Operation (Target Speed Increasing Process)

Figure 2:
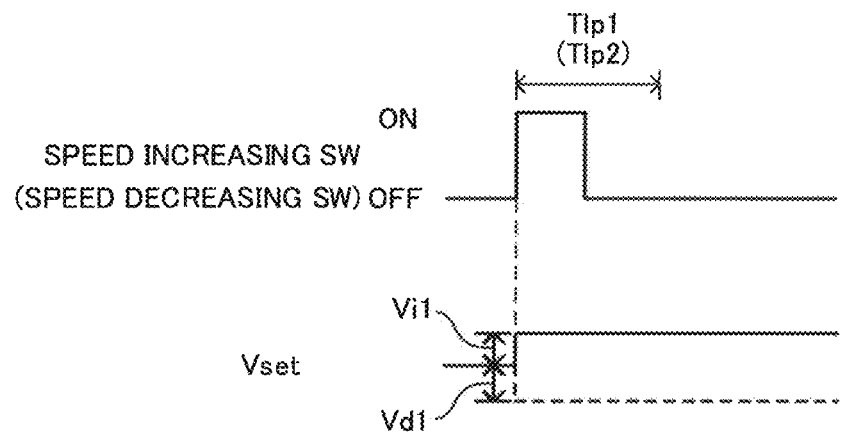
FIG. 2 is a time chart for illustrating an example of a change in a target speed Vset when a short press operation is performed on a speed increasing switch (or a speed decreasing switch).

As illustrated in FIG. 2, the driving assist ECU 10 increases the target speed Vset by a first increase amount Vi1 at the point in time at which the state of the speed increasing switch 63 is changed from the off state to the on state (hereinafter referred to as a "first turned-on time point"). Namely, when the short press operation of the speed increasing switch 63 is performed, the driving assist ECU 10 increases the target speed Vset by the first increase amount Vi1. The process of increasing the target speed Vset by the first increase amount Vi1 in response to the short press operation of the speed increasing switch 63 may be referred to as a "tap up process (or a first increasing process)" in some cases.

A2: Change of Target Speed Vset by Long Press Operation (Target Speed Increasing Process)

Figure 3:
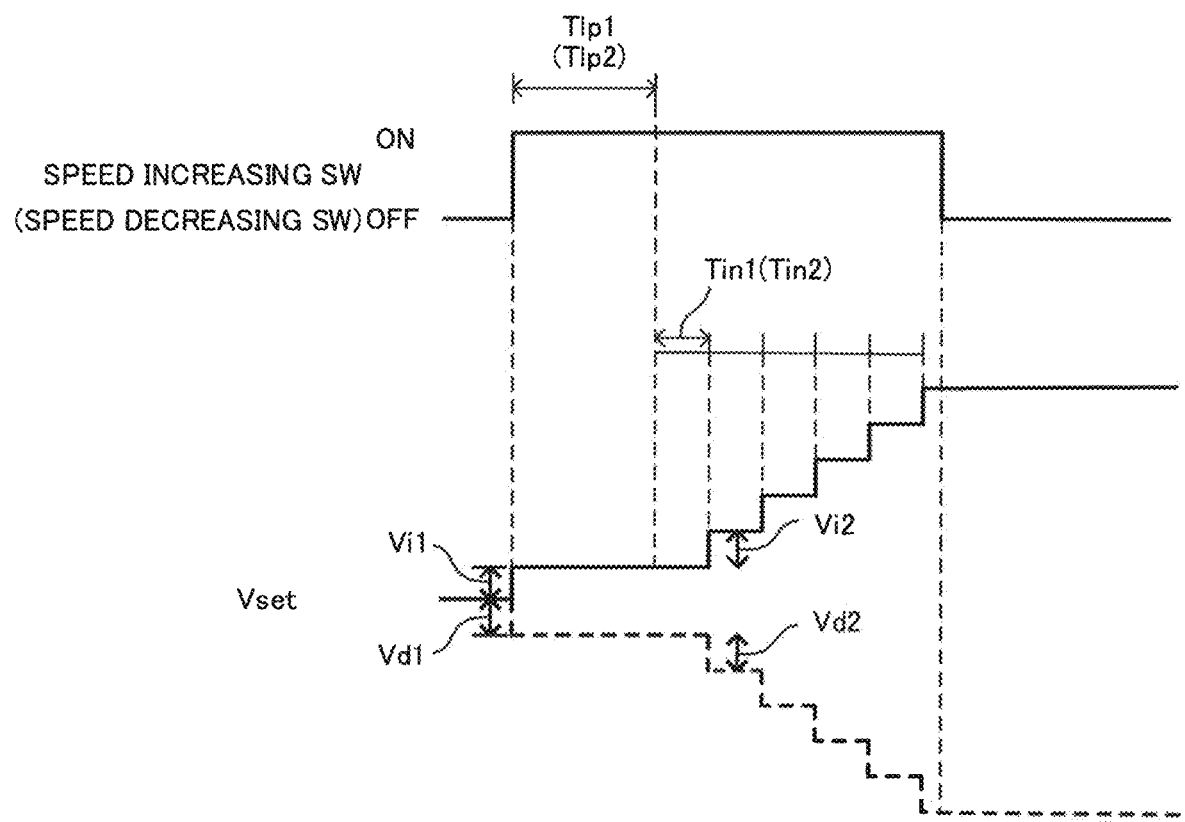
FIG. 3 is a time chart for illustrating an example of a change in the target speed Vset when a long press operation is performed on the speed increasing switch (or the speed decreasing switch).

As illustrated in FIG. 3, the driving assist ECU 10 increases the target speed Vset by the first increase amount Vi1 at the first turned-on time point. Further, in the case where the on state of the speed increasing switch 63 continues from the first turned-on time point for the first long press time Tlp1 or longer, after elapse of the first long press time Tlp1 from the first turned-on time point, the driving assist ECU 10 increases the target speed Vset stepwise (by the second increase amount Vi2 each time) every time a first interval time Tin1 elapses. After the first long press time Tlp1 has elapsed from the first turned-on time point, the driving assist ECU 10 increases the target speed Vset stepwise up to the point in time at which the state of the speed increasing switch 63 is changed from the on state to the off state (hereinafter referred to a "first turned-off time point").

The process of increasing the target speed Vset stepwise (by the second increase amount Vi2 each time) in response to the long press operation of the speed increasing switch 63 may be referred to as an "acceleration process (or a second increasing process)" in some cases.

B1: Change of Target Speed Vset by Short Press Operation (Target Speed Decreasing Process)

As illustrated in FIG. 2, the driving assist ECU 10 decreases the target speed Vset by a first decrease amount Vd1 (see a broken line in FIG. 2) at the point in time at which the state of the speed decreasing switch 64 is changed from the off state to the on state (hereinafter referred to as a "second turned-on time point"). Namely, when the short press operation of the speed decreasing switch 64 is performed, the driving assist ECU 10 decreases the target speed Vset by the first decrease amount Vd1. The process of decreasing the target speed Vset by the first decrease amount Vd1 in response to the short press operation of the speed decreasing switch 64 may be referred to as a "tap down process (or a first decreasing process)" in some cases.

B2: Change of Target Speed Vset by Long Press Operation (Target Speed Decreasing Process)

As illustrated in FIG. 3, the driving assist ECU 10 decreases the target speed Vset by the first decrease amount Vd1 at the second turned-on time point (see a broken line in FIG. 3). Further, in the case where the on state of the speed decreasing switch 64 continues from the second turned-on time point for the second long press time Tlp2 or longer, after elapse of the second long press time Tlp2 from the second turned-on time point, the driving assist ECU 10 decreases the target speed Vset stepwise (by the second decrease amount Vd2 each time) every time a second interval time Tin2 elapses (see the broken line in FIG. 3). After the second long press time Tlp2 has elapsed from the second turned-on time point, the driving assist ECU 10 decreases the target speed Vset stepwise up to the point in time at which the state of the speed decreasing switch 64 is changed from the on state to the off state (hereinafter referred to a "second turned-off time point").

The process of decreasing the target speed Vset stepwise (by the second decrease amount Vd2 each time) in response to the long press operation of the speed decreasing switch 64 may be referred to as a "coast process (or a second decreasing process)" in some cases.

Figure 5:
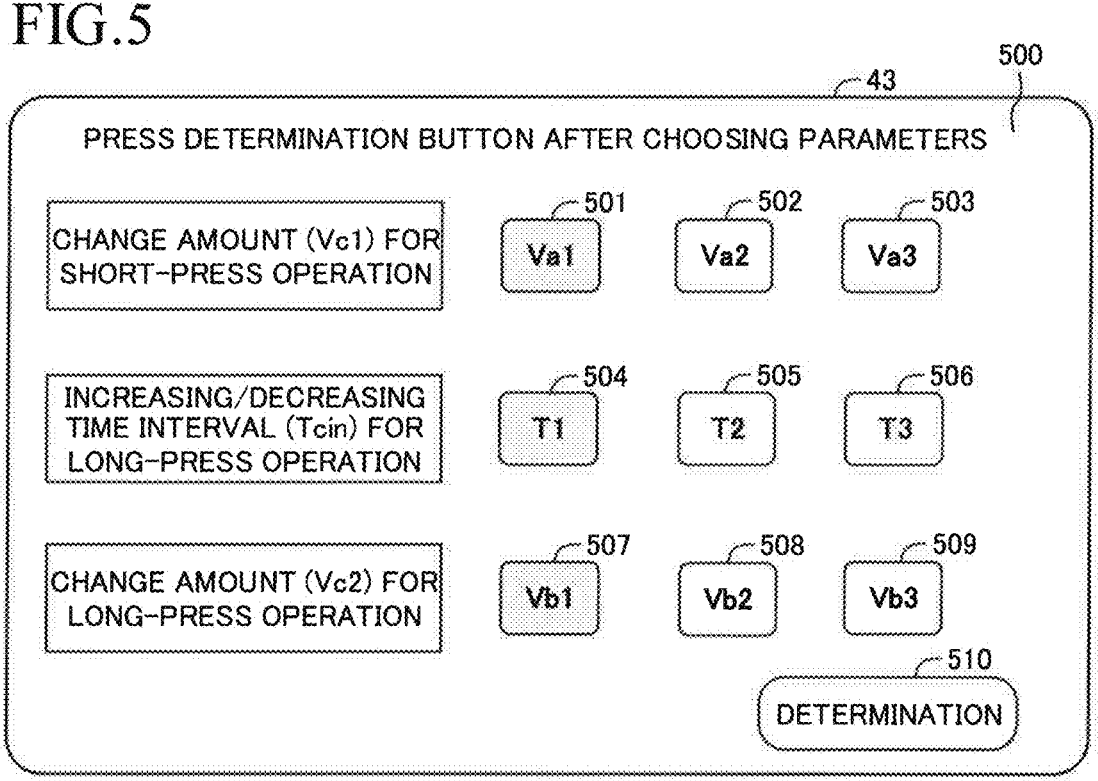
FIG. 5 is a diagram for illustrating an example of a setting screen displayed on a touch panel.

In the present embodiment, the first increase amount Vi1 and the first decrease amount Vd1 are equal to each other, and they will be referred to as a "first speed change amount Vc1" for reasons of convenience. The first speed change amount Vc1 can be changed on a setting screen which will be described later (see FIGS. 5 and 6). The first increase amount Vi1 and the first decrease amount Vd1 may differ from each other.

Similarly, the second increase amount Vi2 and the second decrease amount Vd2 are equal to each other, and they will be referred to as a "second speed change amount Vc2" for reasons of convenience. The second speed change amount Vc2 can be changed on the setting screen which will be described later (see FIGS. 5 and 6). The second increase amount Vi2 and the second decrease amount Vd2 may differ from each other.

Further, the first interval time Tin1 and the second interval time Tin2 are equal to each other, and they will be referred to as a "interval time Tcin" for reasons of convenience. The interval time Tcin can be changed on the setting screen which will be described later (see FIGS. 5 and 6). The first interval time Tin1 and the second interval time Tin2 may differ from each other.

In the following description, the "first speed change amount Vc1, the second speed change amount Vc2, and the interval time Tcin" may be collectively referred to as "parameters of the constant speed travel mode" in some cases.

The parameters of the constant speed travel mode are stored in the nonvolatile memory 104 of the driving assist ECU 10. The driving assist ECU 10 executes the control for the constant speed travel mode by using the parameters of the constant speed travel mode which have been stored in the nonvolatile memory 104.

(Operation—Process of Setting Parameters of Constant Speed Travel Mode)

Every time a predetermined time elapses, the CPU 101 of the driving assist ECU 10 (hereinafter may be simply referred to as the "CPU") executes a routine illustrated in FIG. 4.

Figure 4:
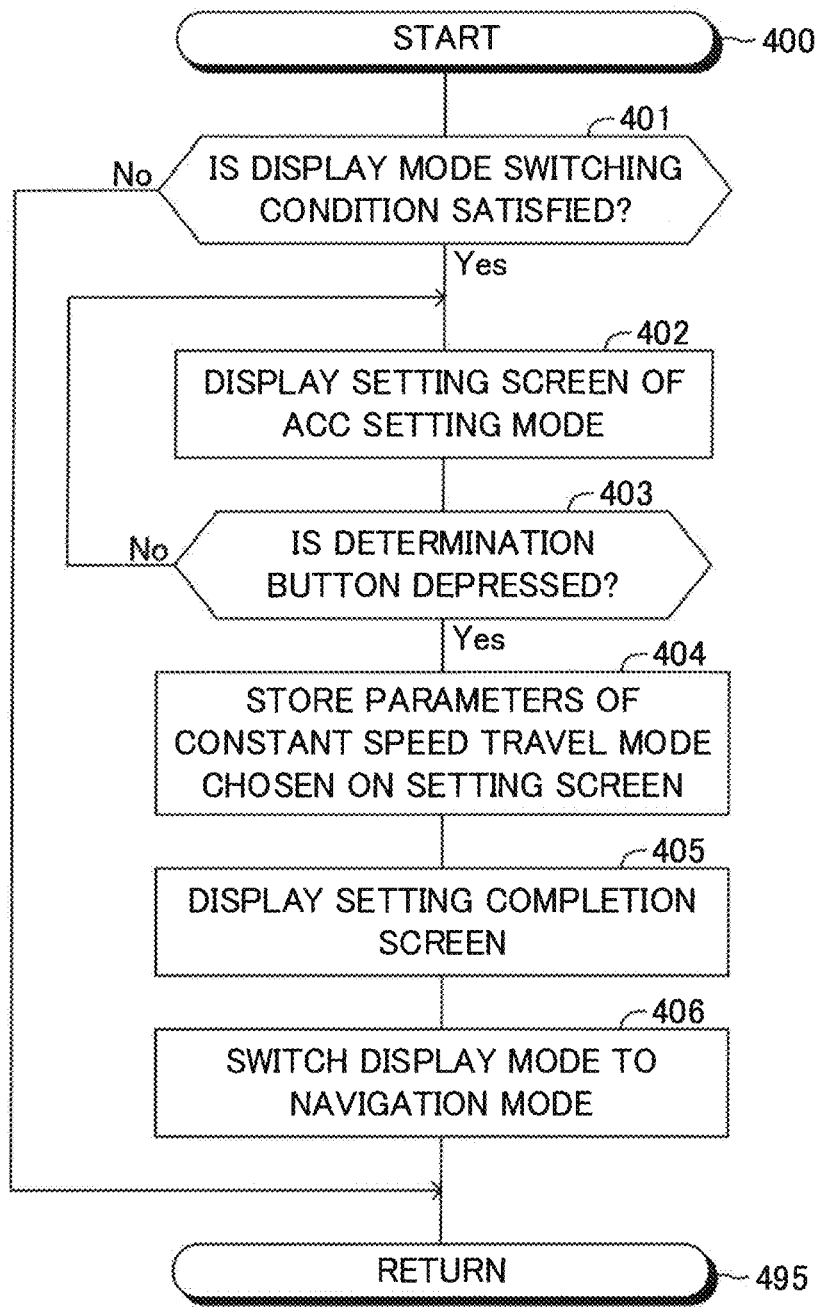
FIG. 4 is a flowchart for illustrating a "setting screen display routine" to be executed by a CPU of a driving assist ECU illustrated in FIG. 1.

When a predetermined timing has come, the CPU starts the process from Step 400 of FIG. 4 and proceeds to Step 401 to determine whether or not a predetermined display mode switching condition is satisfied. The display mode switching condition is satisfied upon satisfaction of all the following Conditions 1 to 4.

Condition 1: The display mode of the screen of the touch panel 43 at the present point in time is the navigation mode.

Condition 2: The mode switching button on the screen displayed on the touch panel 43 has been depressed.

Condition 3: The ACC has not yet been executed at the point in time at which Condition 2 is satisfied.

Condition 4: The vehicle is in a stopped state (i.e., the vehicle speed SPD is zero) at the point in time at which Condition 2 is satisfied.

In the case where the display mode switching condition is not satisfied, the CPU makes a "No" determination in Step 401 and proceeds directly to Step 495 to end the current execution of the present routine.

In the case where the display mode switching condition is satisfied, the CPU makes a "Yes" determination in Step 401 and proceeds to Step 402 to switch the display mode from the navigation mode to the ACC setting mode. Specifically, the CPU causes the touch panel 43 to display a setting screen 500 illustrated in FIG. 5.

Buttons displayed on the setting screen 500 include buttons 501, 502, and 503 corresponding to three values (Va1, Va2, and Va3) which can be chosen as the first speed change amount Vc1; buttons 504, 505, and 506 corresponding to three values (T1, T2, and T3) which can be chosen as the interval time Tcin; buttons 507, 508, and 509 corresponding to three values (Vb1, Vb2, and Vb3) which can be chosen as the second speed change amount Vc2; and a determination button 510.

When the CPU displays the setting screen 500, the CPU reads the parameters of the constant speed travel mode stored in the nonvolatile memory 104 (namely, the current set values of the parameters). Then, the CPU displays the setting screen 500 such that the current set values of the parameters are highlighted (are recognizable). In the example illustrated in FIG. 5, the current set values of the first speed change amount Vc1, the interval time Tcin, and the second speed change amount Vc2 are "Va1," "T1," and "Vb1," respectively. Accordingly, the button 501, the button 504, and the button 507 are displayed in a state in which they are highlighted as compared with other buttons.

Figure 6:
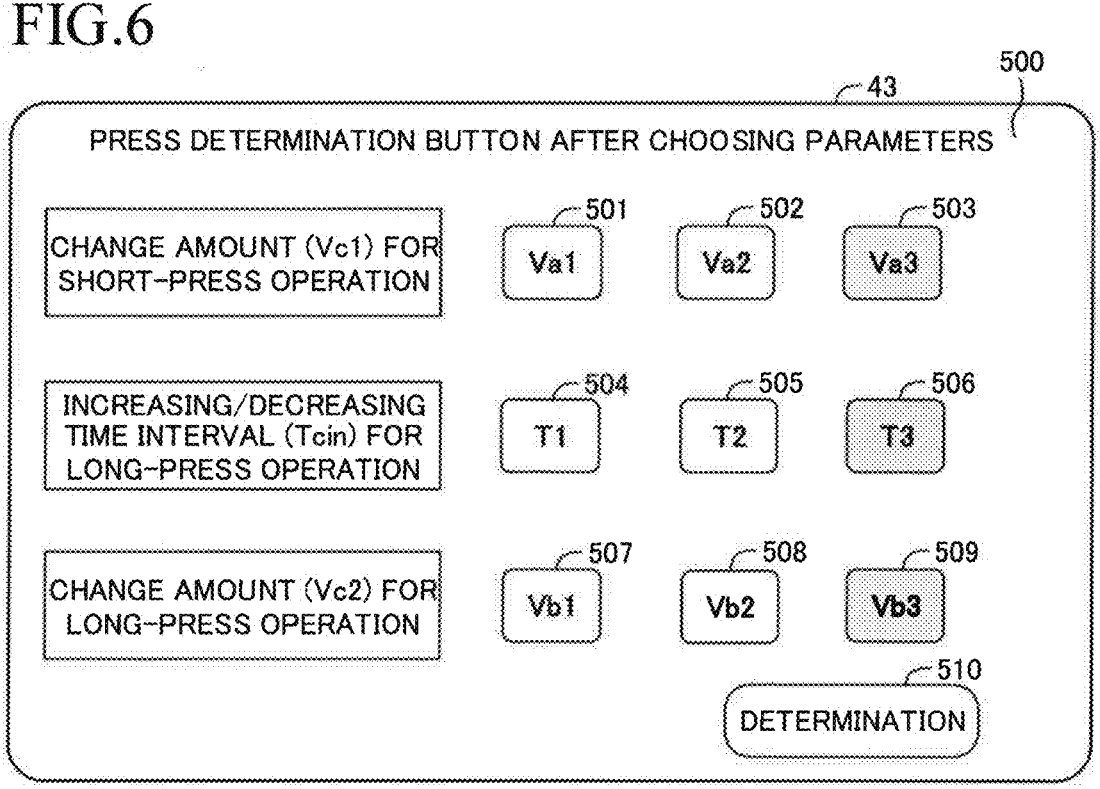
FIG. 6 is a diagram for illustrating the example of the setting screen displayed on the touch panel.

The driver chooses respective values of the parameters of the constant speed travel mode on the setting screen 500 through a touch operation (operation of selectively touching the buttons displayed on the touch panel 43) with his/her finger. For example, the driver chooses "Va3" as the first speed change amount Vc1 by touching the button 503 with his/her finger, chooses "T3" as the interval time Tcin by touching the button 506 with his/her finger, and chooses "Vb3" as the second speed change amount Vc2 by touching the button 509 with his/her finger. As a result, as illustrated in FIG. 6, the buttons corresponding to the chosen values of the parameters (i.e., the buttons 503, 506, and 509) are displayed in a highlighted state.

Next, the CPU proceeds to Step 403 to determine whether or not the determination button 510 is depressed. In the case where the determination button 510 is not depressed, the CPU makes a "No" determination in Step 403 and returns to Step 402.

In the case where the determination button 510 is depressed, the CPU makes a "Yes" determination in Step 403 and sequentially performs Step 404 to Step 406 which are described below. Subsequently, the CPU proceeds to Step 495 to end the current execution of the present routine.

Step 404: The CPU stores in the nonvolatile memory 104 the respective values of the parameters of the constant speed travel mode chosen on the setting screen 500. Namely, the CPU updates (changes) the values of the parameters of the constant speed travel mode stored in the nonvolatile memory 104 to the values of the parameters of the constant speed travel mode which have been chosen on the setting screen 500.

In the case of the example of FIG. 6, the CPU stores Va3" in the nonvolatile memory 104 as the first speed change amount Vc1 (Vi1, Vd1). The CPU stores "T3" in the nonvolatile memory 104 as the interval time Tcin (Tin1, Tin2). The CPU stores "Vb3" in the nonvolatile memory 104 as the second speed change amount Vc2 (Vi2, Vd2).

Figure 7:
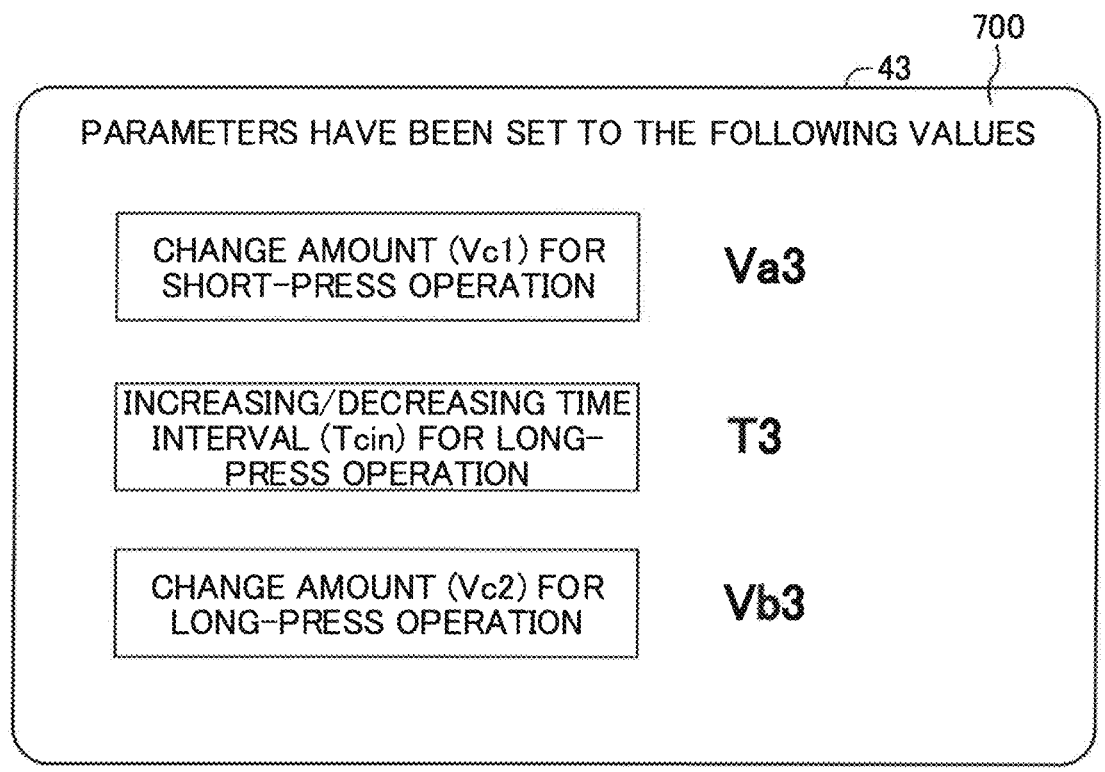
FIG. 7 is a diagram for illustrating an example of a setting completion screen displayed on the touch panel.

Step 405: The CPU displays a setting completion screen 700 on the touch panel 43 as illustrated in FIG. 7. The updated values of the parameters of the constant speed travel mode (the first speed change amount Vc1, the interval time Tcin, and the second speed change amount Vc2) are displayed on the setting completion screen 700.

Step 406: The CPU switches the display mode from the ACC setting mode to the navigation mode.

According to the control apparatus, the driver can change (set), in accordance with his/her preference, the parameters of the constant speed travel mode (the first speed change amount Vc1, the interval time Tcin, and the second speed change amount Vc2) on the setting screen 500. The parameters of the constant speed travel mode which have been changed (set) on the setting screen 500 are stored in the nonvolatile memory 104 of the driving assist ECU 10. The driving assist ECU 10 executes the target speed increasing process and the target speed decreasing process in accordance with the parameters of the constant speed travel mode which have been stored in the nonvolatile memory 104. By virtue of the above-described configuration, when the driver operates either of the speed increasing switch 63 and the speed decreasing switch 64 in a period during which the control for the constant speed travel mode of the ACC is being executed, the driver can change the target speed Vset by a change amount which the driver prefers (the first speed change amount Vc1 or the second speed change amount Vc2). Further, when the driver performs the long press operation on either of the speed increasing switch 63 and the speed decreasing switch 64, the driver can change the target speed Vset every time the interval time Tcin which the driver prefers elapses.

The present disclosure is not limited to at least one embodiment described above, and various modification examples can be adopted within the scope of the present disclosure.

(Modification 1)

Figure 8:
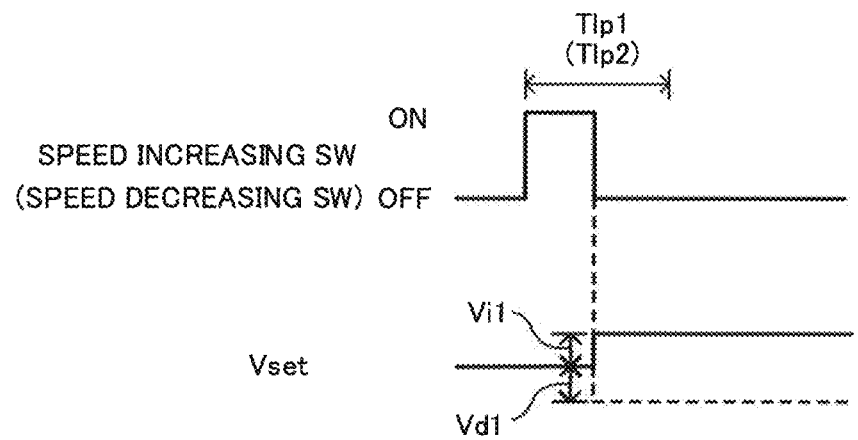
FIG. 8 is a time chart for illustrating another example of a change in the target speed Vset when a short press operation is performed on the speed increasing switch (or the speed decreasing switch).

When the short press operation is performed, the target speed Vset may be changed as illustrated in FIG. 8. Specifically, the above-described embodiment may be modified in such a manner that, in the case where the state of the speed increasing switch 63 is changed from the on state to the off state before the first long press time Tlp1 elapses from the first turned-on time point, the driving assist ECU 10 increases the target speed Vset by the first increase amount Vi1 at the point in time at which the state of the speed increasing switch 63 is changed from the on state to the off state.

Similarly, the above-described embodiment may be modified in such a manner that, in the case where the state of the speed decreasing switch 64 is changed from the on state to the off state before the second long press time Tlp2 elapses from the second turned-on time point, the driving assist ECU 10 decreases the target speed Vset by the first decrease amount Vd1 at the point in time at which the state of the speed decreasing switch 64 is changed from the on state to the off state (see a broken line in FIG. 8).

Figure 9:
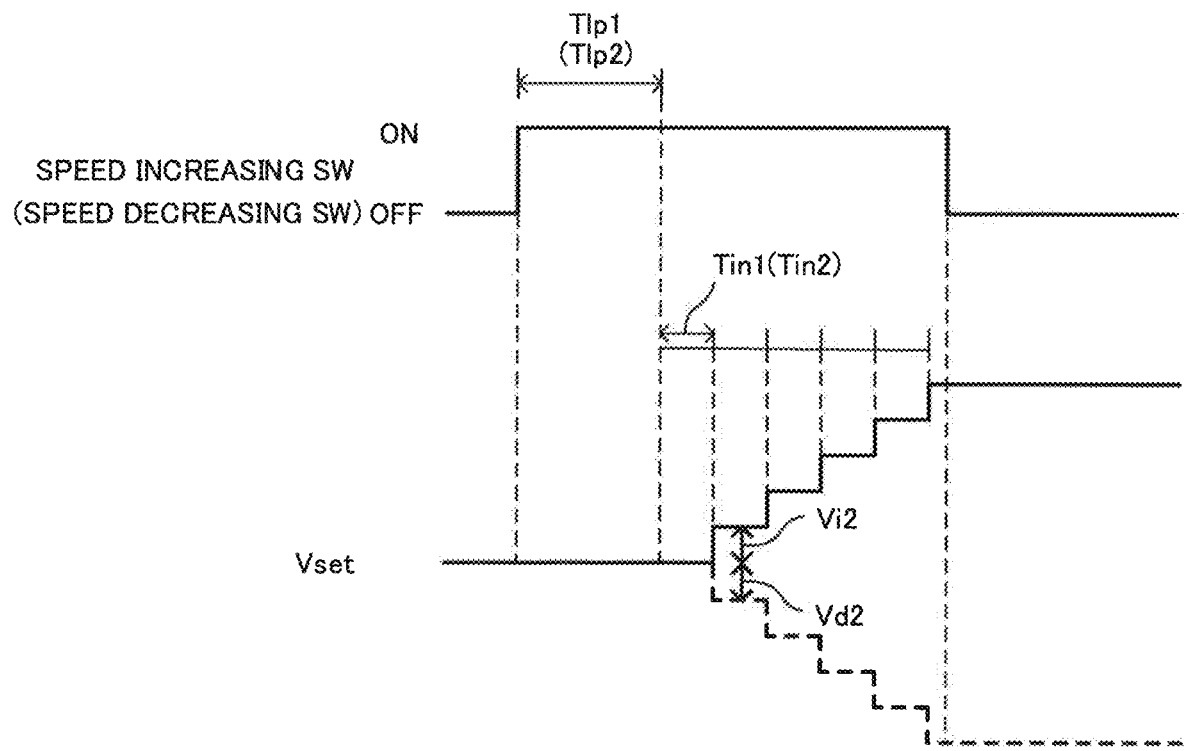
FIG. 9 is a time chart for illustrating another example of a change in the target speed Vset when a long press operation is performed on the speed increasing switch (or the speed decreasing switch).

Further, when the long press operation is performed, the target speed Vset may be changed as illustrated in FIG. 9. The driving assist ECU 10 does not change the target speed Vset at the first turned-on time point. In the case where the on state of the speed increasing switch 63 continues from the first turned-on time point for the first long press time Tlp1 or longer, after elapse of the first long press time Tlp1 from the first turned-on time point, the driving assist ECU 10 increases the target speed Vset by the second increase amount Vi2 every time the first interval time Tin1 elapses.

Similarly, the driving assist ECU 10 does not change the target speed Vset at the second turned-on time point. In the case where the on state of the speed decreasing switch 64 continues from the second turned-on time point for the second long press time Tlp2 or longer, after elapse of the second long press time Tlp2 from the second turned-on time point, the driving assist ECU 10 decreases the target speed Vset by the second decrease amount Vd2 every time the second interval time Tin2 elapses (see a broken line in FIG. 9).

(Modification 2)

Figure 10:
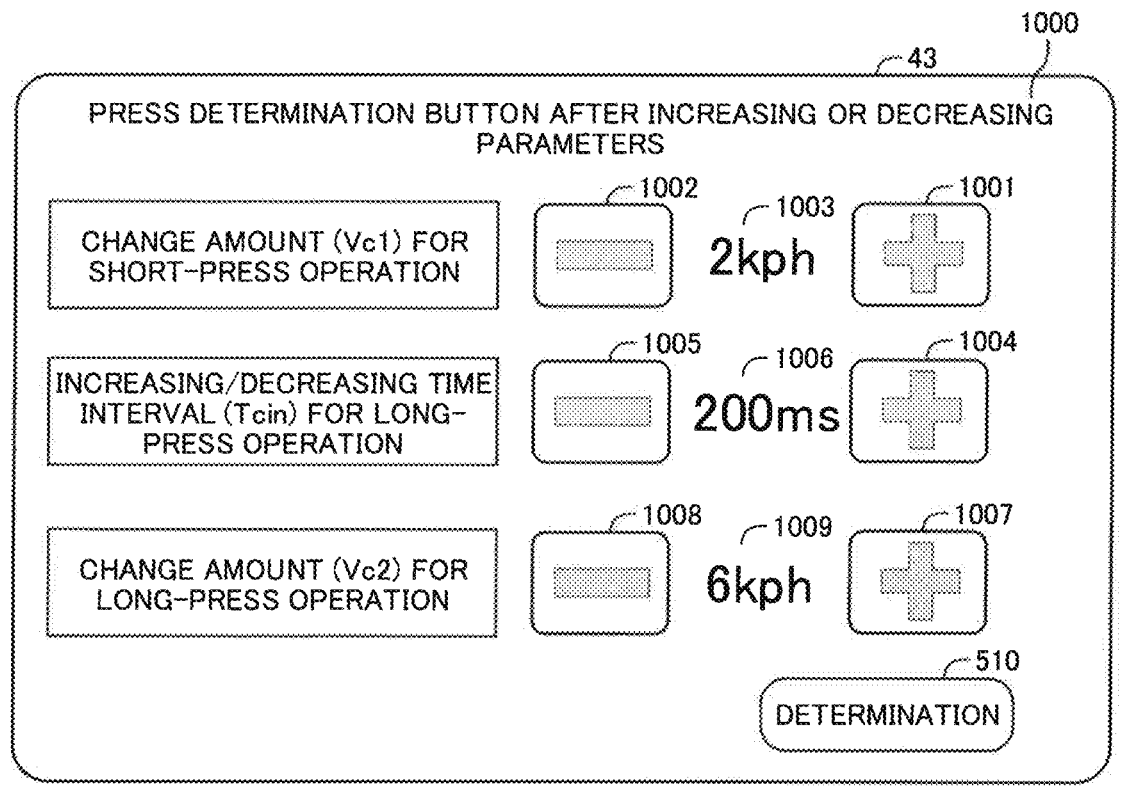
FIG. 10 is a diagram for illustrating another example of the setting screen displayed on the touch panel.

The setting screen for changing the parameters of the constant speed travel mode is not limited to the setting screen used in the above-described embodiment. For example, the above-described embodiment may be modified in such a manner that, in Step 402 of the routine of FIG. 4, the CPU displays a setting screen 1000 illustrated in FIG. 10. A plus button 1001 and a minus button 1002 are displayed on the setting screen 1000. The plus button 1001 is used to increase the value of the first speed change amount Vc1 by a predetermined speed increment (for example, 1 kph) at a time. The minus button 1002 is used to decrease the value of the first speed change amount Vc1 by a predetermined speed decrement (for example, 1 kph) at a time. Further, the value of the first speed change amount Vc1 is displayed at a position 1003 between the plus button 1001 and the minus button 1002. When the driver performs a touch operation on either of the plus button 1001 and the minus button 1002, during the period during which the touch operation continues, the value of the first speed change amount Vc1 continuously changes (increases or decreases) stepwise; i.e., changes (increases or decreases) by the predetermined speed increment or decrement each time a predetermined time elapses. The value of the first speed change amount Vol can be changed between a predetermined lower limit (for example, 1 kph) to a predetermined upper limit (for example, 10 kph).

Further, another plus button 1004 and another minus button 1005 are displayed on the setting screen 1000. The plus button 1004 is used to increase the value of the interval time Tcin by a predetermined time increment (for example, 50 ms) at a time. The minus button 1005 is used to decrease the value of the interval time Tcin by a predetermined time decrement (for example, 50 ms) at a time. Further, the value of the interval time Tcin is displayed at a position 1006 between the plus button 1004 and the minus button 1005. When the driver performs a touch operation on either of the plus button 1004 and the minus button 1005, during the period during which the touch operation continues, the value of the interval time Tcin continuously changes (increases or decreases) stepwise; i.e., changes (increases or decreases) by the predetermined time increment or decrement each time a predetermined time elapses. The value of the interval time Tcin can be changed between a predetermined lower limit (for example, 200 ms) to a predetermined upper limit (for example, 800 ms).

In addition, still another plus button 1007 and still another minus button 1008 are displayed on the setting screen 1000. The plus button 1007 is used to increase the value of the second speed change amount Vc2 by a predetermined speed increment (for example, 1 kph) at a time. The minus button 1008 is used to decrease the value of the second speed change amount Vc2 by a predetermined speed decrement (for example, 1 kph) at a time. Further, the value of the second speed change amount Vc2 is displayed at a position 1009 between the plus button 1007 and the minus button 1008. When the driver performs a touch operation on either of the plus button 1007 and the minus button 1008, during the period during which the touch operation continues, the value of the second speed change amount Vc2 continuously changes (increases or decreases) stepwise; i.e., changes (increases or decreases) by the predetermined speed increment or decrement each time a predetermined time elapses.

The value of the second speed change amount Vc2 can be changed between a predetermined lower limit (for example, 1 kph) to a predetermined upper limit (for example, 10 kph).

(Modification 3)

The operation device 60 may be provided on an operation lever attached to a steering column (not shown). Such a configuration is well known (see, for example, Japanese Patent Application Laid-Open (kokai) Nos. 2018-070040 and 2018-047795). The operation lever (specifically, its axis) extends outward in the radial direction of the steering wheel. The operation lever is attached to the steering column in such a manner that the operation lever can be tilted in an upward direction, a downward direction, and a direction toward the near side (toward the rear of the vehicle) as viewed from the driver.

In the above-described configuration, the main switch 61 is disposed at a distal end of the operation lever. Every time the main switch 61 is pushed, the state of the main switch 61 changes between the on state and the off state.

The cancellation switch 62 is brought into the on state when the driver pulls the operation lever toward the near side. When the driver releases the operation lever after that, the cancellation switch 62 is brought into the off state.

The resuming/speed increasing switch 63 is brought into the on state when the driver performs pressing operation on the operation lever in the upward direction. When the driver releases the operation lever after that, the resuming/speed increasing switch 63 is brought into the off state. Accordingly, the "operation performed on the operation lever such that the pressing operation on the operation lever in the upward direction is continued (maintained) for the first long press time Tlp1 or longer" corresponds to the above-described "long press operation of the speed increasing switch 63." The "driver's operation of releasing the operation lever after having started the pressing operation on the operation lever in the upward direction, before elapse of the first long press time Tlp1" corresponds to the above-described "short press operation of the speed increasing switch 63."

The setting/speed decreasing switch 64 is brought into the on state when the driver performs pressing operation on the operation lever in the downward direction. When the driver releases the operation lever after that, the setting/speed decreasing switch 64 is brought into the off state. Accordingly, the "operation performed on the operation lever such that the pressing operation on the operation lever in the downward direction is continued (maintained) for the second long press time Tlp2 or longer" corresponds to the above-described "long press operation of the speed decreasing switch 64." The "driver's operation of releasing the operation lever after having started the pressing operation on the operation lever in the downward direction, before elapse of the second long press time Tlp2" corresponds to the above-described "short press operation of the speed decreasing switch 64."

(Modification 4)

The driving assist ECU 10 may be configured to execute the tap up process and the tap down process without executing the acceleration process and the coast process. Namely, the driving assist ECU 10 changes the target speed Vset by the first speed change amount Vc1 only when either of the speed increasing switch 63 and the speed decreasing switch 64 is switched from the off state to the on state irrespective of (i.e., without determining) whether the operation on the speed increasing switch 63 or the speed decreasing switch 64 is the long press operation or the short press operation. In the case where such a configuration is employed, at Step 402 of the routine of FIG. 4, the CPU of the driving assist ECU 10 displays a setting screen which allows the driver to change the first speed change amount Vc1 (i.e., a screen obtained by, for example, eliminating the buttons 504 to 509 from the setting screen 500). In this case as well, the driver can change the first speed change amount Vc1 in accordance with his/her preference.

Alternatively, the driving assist ECU 10 may be configured to execute the acceleration process and the coast process without executing the tap up process and the tap down process. In this case, the target speed Vset is changed only when the long press operation is performed on either of the speed increasing switch 63 and the speed decreasing switch 64. The target speed Vset is not changed at the point in time when the state of the speed increasing switch 63 or the speed decreasing switch 64 changes from the off state to the on state. In the case where such a configuration is employed, at Step 402 of the routine of FIG. 4, the CPU of the driving assist ECU 10 displays a setting screen which allows the driver to change the second speed change amount Vc2 and the interval time Tcin (i.e., a screen obtained by, for example, eliminating the buttons 501 to 503 from the setting screen 500). Accordingly, the driver can change the second speed change amount Vc2 and the interval time Tcin in accordance with his/her preference.

(Modification 5)

The setting screen displayed in Step 402 of the routine of FIG. 4 may be configured to allow the driver to change the first increase amount Vi1 and the first decrease amount Vd1 independently of each other.

Further, the setting screen may be configured to allow the driver to change the second increase amount Vi2 and the second decrease amount Vd2 independently of each other.

Further, the setting screen may be configured to allow the driver to change the first interval time Tin1 and the second interval time Tin2 independently of each other.

(Modification 6)

The setting screen displayed in Step 402 of the routine of FIG. 4 may be configured to allow the driver to change some of the parameters of the constant speed travel mode on the setting screen. Namely, the setting screen may be configured to allow the driver to change one or more parameters selected from the following parameters (i) to (iv).

(i) First increase amount Vi1
(ii) Second increase amount Vi2 and First interval time Tin1
(iii) First decrease amount Vd1
(iv) Second decrease amount Vd2 and Second interval time Tin2

(Modification 7)

The setting screen for changing the parameters of the constant speed travel mode may be displayed on a display unit/device other than the touch panel 43. For example, the driving assist ECU 10 may be configured such that the CPU of the driving assist ECU 10 displays the setting screen on the display 51. In this case, specific buttons and/or switches for choosing the values of the parameters of the constant speed travel mode may be provided on the steering wheel.

(Modification 8)

In the above-described embodiment, the driving assist ECU 10 is configured to execute both the control for the follow-up travel mode and the control for the constant speed travel mode. However, the configuration of the driving assist ECU 10 is not limited to such a configuration. The driving assist ECU 10 may be configured to execute the control for the constant speed travel mode without performing the control for the follow-up travel mode.

What is claimed is:

1. A vehicle travel control apparatus comprising:
a switch provided in a vehicle and configured to be operated by a driver, the switch including a speed increasing switch configured to be switched to an on state when a pressing operation is performed on the speed increasing switch, and configured to be switched to an off state when the pressing operation is not performed on the speed increasing switch;
a vehicle controller configured to execute constant speed travel control for causing the vehicle to travel such that a travel speed of the vehicle matches a target speed, the vehicle controller being further configured to execute a target speed increasing process of increasing the target speed by a predetermined speed increase amount at a predetermined timing within a time period between a first turned-on time point at which the speed increasing switch is switched from the off state to the on state and a first turned-off time point at which the speed increasing switch is switched from the on state to the off state;
a display configured to display a setting screen which allows the driver to change at least the speed increase amount; and
a memory configured to store at least the speed increase amount which has been changed on the setting screen, wherein
the vehicle controller is configured to execute the target speed increasing process in accordance with the speed increase amount which has been stored in the memory,
the vehicle controller is configured to increase the target speed by using a first increase amount and a second increase amount as the speed increase amount in the target speed increasing process;
the vehicle controller is configured to execute a first increasing process and a second increasing process as the target speed increasing process;
the first increasing process is a process of increasing the target speed by the first increase amount at the first turned-on time point or a process of increasing the target speed by the first increase amount at the first turned-off time point in a case where the first turned-off time point is a point in time before a predetermined first long press time elapses from the first turned-on time point;
the second increasing process is a process performed in a case where the on state of the speed increasing switch continues from the first turned-on time point for the first long press time or longer, and performed such that, after elapse of the first long press time from the first turned-on time point, the process increases the target speed stepwise, until the first turned-off time point, by the second increase amount every time a first interval time elapses;
the display is configured to display, as the setting screen, a screen which allows the driver to change the first increase amount, the second increase amount, and the first interval time;
the memory is configured to store the first increase amount, the second increase amount, and the first interval time which have been changed on the setting screen; and
the vehicle controller is configured to execute the target speed increasing process in accordance with the first increase amount, the second increase amount, and the first interval time which have been stored in the memory.

2. A vehicle travel control apparatus according to claim 1, wherein
- the switch further includes a speed decreasing switch configured to be switched to an on state when a pressing operation is performed on the speed decreasing switch, and configured to be switched to an off state when the pressing operation is not performed on the speed decreasing switch;
- the vehicle controller is configured to execute a target speed decreasing process of decreasing the target speed by a predetermined speed decrease amount at a predetermined timing within a time period between a second turned-on time point at which the speed decreasing switch is switched from the off state to the on state and a second turned-off time point at which the speed decreasing switch is switched from the on state to the off state;
- the display is configured to display, as the setting screen, a screen which allows the driver to change the speed decrease amount;
- the memory is configured to further store the speed decrease amount which has been changed on the setting screen;
- the vehicle controller is configured to execute the target speed decreasing process in accordance with the speed decrease amount which has been stored in the memory,
- the vehicle controller is configured to decrease the target speed by using a first decrease amount and a second decrease amount as the speed decrease amount in the target speed decreasing process;
- the vehicle controller is configured to execute a first decreasing process and a second decreasing process as the target speed decreasing process;
- the first decreasing process is a process of decreasing the target speed by the first decrease amount at the second turned-on time point or a process of decreasing the target speed by the first decrease amount at the second turned-off time point in a case where the second turned-off time point is a point in time before a predetermined second long press time elapses from the second turned-on time point;
- the second decreasing process is a process performed in a case where the on state of the speed decreasing switch continues from the second turned-on time point for the second long press time or longer, and performed such that, after elapse of the second long press time from the second turned-on time point, the process decreases the target speed stepwise, until the second turned-off time point, by the second decrease amount every time a second interval time elapses;
- the display is configured to display, as the setting screen, a screen which allows the driver to change the first decrease amount, the second decrease amount, and the second interval time;
- the memory is configured to store the first decrease amount, the second decrease amount, and the second interval time which have been changed on the setting screen; and
- the vehicle controller is configured to execute the target speed decreasing process in accordance with the first decrease amount, the second decrease amount, and the second interval time which have been stored in the memory.

* * * * *